(12) United States Patent
Jaeger et al.

(10) Patent No.: US 7,689,358 B2
(45) Date of Patent: Mar. 30, 2010

(54) DELTA-V-FREE SATELLITE CLOUD CLUSTER FLYING

(75) Inventors: Talbot John Jaeger, Los Alamitos, CA (US); Phong David Ngo, Manhattan Beach, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 312 days.

(21) Appl. No.: 11/411,046

(22) Filed: Apr. 25, 2006

(65) Prior Publication Data

US 2007/0250267 A1 Oct. 25, 2007

(51) Int. Cl.
*G01C 21/00* (2006.01)

(52) U.S. Cl. ........................ 701/226; 701/213

(58) Field of Classification Search ................. 701/200, 701/213–215, 226, 3, 13; 244/158.1; 342/357.06
See application file for complete search history.

(56) References Cited

U.S. PATENT DOCUMENTS

| 4,375,697 | A |   | 3/1983  | Visher            |
|-----------|---|---|---------|-------------------|
| 4,691,882 | A | * | 9/1987  | Young ..................... 244/158.4 |
| 4,931,802 | A | * | 6/1990  | Assal et al. ................. 342/356 |
| 5,613,653 | A |   | 3/1997  | Bombled et al.    |
| 5,931,419 | A |   | 8/1999  | Collyer           |
| 5,961,077 | A |   | 10/1999 | Koppel et al.     |
| 5,979,830 | A |   | 11/1999 | Kellermeier       |
| 6,059,233 | A |   | 5/2000  | Koppel et al.     |
| 6,126,116 | A | * | 10/2000 | Cellier ..................... 244/158.4 |
| 6,553,286 | B2 |  | 4/2003  | Turner et al.     |
| 6,677,884 | B2 |  | 1/2004  | Moreira et al.    |
| 6,725,012 | B1 |  | 4/2004  | Janson et al.     |

FOREIGN PATENT DOCUMENTS

EP 0 843 245 A 5/1998

OTHER PUBLICATIONS

Robert A. Braeunig; "*Orbital Mechanics*"; 1997, 2005; http://www.braeunig.us/space/orbmech.htm; pp. 1-20.

Boutonnet A et al: "*Optimal Invariant Spacecraft Formation Deployment with Collision Risk Management*"; Journal of Spacecraft and Rockets, American Institute of Aeronautics and Astronautics, Reston, VA, US, vol. 42, No. 5, Sep. 2005; pp. 913-920, XP001238760, ISSN: 0022-4650; whole document.

European Search Report for corresponding EP 07 00 8406, completed Nov. 20, 2007 by Carlos Weber of the EPO.

* cited by examiner

*Primary Examiner*—Yonel Beaulieu
(74) *Attorney, Agent, or Firm*—Tarolli, Sundheim, Covell & Tummino LLP

(57) ABSTRACT

A system and method is provided for establishing a substantially delta-V-free three-dimensional atomic satellite cloud cluster. In one embodiment, a satellite cloud cluster system comprises a plurality of satellites maintaining a three-dimensional periodic motion relative to a reference point. The plurality of satellites and the reference point maintain an orbital pattern around a celestial body. The three-dimensional periodic motion is symmetrical about at least two planes that intersect at the reference point.

30 Claims, 10 Drawing Sheets

DELTA-V-FREE SATELLITE CLOUD CLUSTER FLYING

TECHNICAL FIELD

The present invention relates generally to satellites, and more particularly to establishing a satellite cloud cluster orbit that is substantially delta-V-free.

BACKGROUND

The technology of information transfer through satellites continues to increase rapidly due to the climbing demand for wireless communication applications. As the demand for wireless communication applications increases, so also does the demand for satellite payload. It is very difficult and very expensive to design and implement single monolithic satellite systems, to integrate the requirements of multiple subsystems and payloads, and to adhere to tight launch constraints. To alleviate this difficulty, a satellite's functionality can be distributed into a group of satellites. By distributing satellite functionality, launch options increase, financial and scheduling constraints become more flexible, the system becomes more modular, and each payload or subsystem can become optimized for a given purpose.

To distribute satellite functionality, the launching of a group of satellites occurs using a specific technique called formation flight. Formation-keeping involves the use of an active control scheme to maintain the relative positions of the spacecraft. It is often very important to keep relative positional control for certain satellite applications, such as radar or optical interferometry. However, formation-keeping puts tight tolerances on the control system, and satellites kept in stationary relative positions are often subject to large drift forces. To compensate for drift, a satellite must expend large amounts of fuel to keep formation over long durations, thus necessitating a large amount of delta-V to maintain operation.

SUMMARY

One embodiment of the present invention may include a satellite cloud cluster system. The satellite cloud cluster system comprises a plurality of satellites maintaining a three-dimensional periodic motion relative to a reference point. The plurality of satellites and the reference point maintain an orbital pattern around a celestial body. The three-dimensional periodic motion is symmetrical about at least two planes that intersect at the reference point.

Another embodiment of the present invention may include a satellite cloud cluster system. The satellite cloud cluster system comprises a first plurality of satellites maintaining a first periodic motion relative to a reference point. The reference point maintains an orbital pattern around a celestial body. The satellite cloud cluster system also comprises a second plurality of satellites maintaining a second periodic motion relative to the reference point. The satellite cloud cluster system also comprises a third plurality of satellites maintaining a third periodic motion relative to the reference point. Each of the first, second, and third pluralities of satellites are communicatively coupled to each other.

Another embodiment of the present invention may include a method for establishing a satellite cloud cluster orbit. The method comprises launching the satellite cloud cluster into a formation-flight maintaining an orbital path about a celestial body. The method also comprises applying minimal delta-V impulse thrusts to a first plurality of satellites of the satellite cloud cluster to set the first plurality of satellites in a first periodic motion relative to a reference point. The reference point orbits the celestial body at an equal velocity along the same orbital path as the formation flight. The method also comprises applying minimal delta-V impulse thrusts to a second plurality of satellites of the satellite cloud cluster to set the second plurality of satellites in a second periodic motion relative to the reference point. The method further comprises applying minimal delta-V impulse thrusts to a third plurality of satellites of the satellite cloud cluster to set the third plurality of satellites in a third periodic motion relative to the reference point.

DETAILED DESCRIPTION

The present invention relates generally to satellites, and more particularly to establishing a satellite cloud cluster orbit that is substantially delta-V-free. Each of a plurality of satellites maintains an orbit around a celestial body, such as Earth. The orbital parameters associated with each orbit of a group of satellites are modified slightly relative to each other. The result is a three-dimensional satellite cloud cluster that maintains an orbital pattern around the celestial body. Each satellite in the satellite cloud cluster has a periodic motion relative to a reference point, the reference point being a point that maintains an orbit around the celestial body with the satellite cloud cluster. For example, the reference point could be a satellite at the center of the satellite cloud cluster. As the satellites in the satellite cloud cluster appear to orbit around the reference point, the satellite cloud cluster can be thought of as an atomic cloud, with the satellites in the satellite cloud "atom" orbiting around the reference point "nucleus" in a manner similar to electron motion. Because each of the satellites in the satellite cloud cluster maintains its individual orbit around the celestial body, the plurality of satellites remain a coherent satellite cloud cluster substantially without expenditure of delta-V impulsive thrusts to keep a formation flight. The orbital parameters that define their individual orbits can be modified only very slightly, such that the plurality of satellites that are comprised within the satellite cloud cluster can be very tightly grouped into a three-dimensional group. As such, the substantially delta-V-free three-dimensional atomic satellite cloud cluster becomes a distributed satellite system that can receive uplink signals and transmit downlink signals more efficiently by employing the individual satellites of the satellite cloud cluster to communicate with each other and adjust communication parameters relative to each other.

Figure 1:
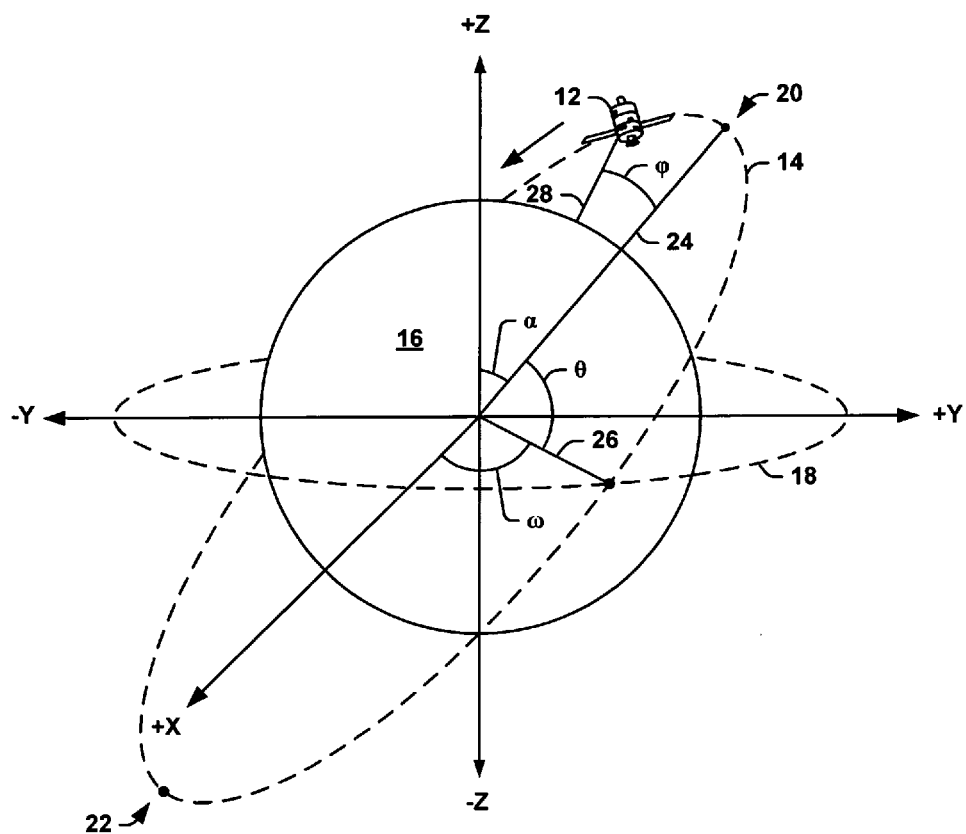
FIG. 1 illustrates a satellite in orbit around a celestial body, defining orbital parameters in accordance with an aspect of the invention.

FIG. 1 illustrates a satellite system 10 that includes a satellite 12 in an orbit 14 around a celestial body 16 in accordance with an aspect of the invention. The celestial body 16 could be, for example, Earth, and is centered at the origin of a three-dimensional Cartesian coordinate system with defined X, Y, and Z-axes. The celestial body 16 has an equatorial plane 18 that is coplanar with the X-Y plane. In the example of the celestial body 16 being Earth, the Z-axis could be collinear with the north and south poles, and the equatorial plane 18 could be coplanar with the Earth's Equator. The orbit 14 of the satellite 12 is illustrated as an inclined, elliptical orbit. The orbit 14 has a perigee 20 in the +Z direction above the X-Y plane and an apogee 22 in the −Z direction below the X-Y plane. The perigee 20 and the apogee 22 are connected by a major axis that passes through a center point and two foci (not shown) of the elliptical orbit 14. It is to be understood that the celestial body 16 is centered at a focus of the elliptical orbit 14, such that it shares a common point with the Cartesian coordinate origin. It is also to be understood that the orbit 14 of the satellite 12 is not limited to the inclined, elliptical orbit depicted in the example of FIG. 1, but could be any type of orbit, such as a circular, geosynchronous orbit. The orbit 14 of the satellite 12 is defined by six orbital parameters (Keplerian elements): mean altitude, eccentricity, inclination, right ascension of the ascending node (RAAN), argument of perigee, and true anomaly.

Mean altitude of a given satellite orbit is defined as the size of the orbit. For example, a circular orbit has a mean altitude that is approximately equal to the radius of the circular orbit. In the example of FIG. 1, the orbit 14 of the satellite 12 has a mean altitude approximately equal to the length of a semimajor axis, which is approximately half the length of the major axis of the elliptical orbit 14 of the satellite 12.

Eccentricity of a given satellite orbit is defined as the shape of the orbit. A circular orbit has an eccentricity of approximately 0, while an elliptical orbit, such as the orbit 14 of the satellite 12 in the example of FIG. 1, has a value of eccentricity that is between 0 and 1. An eccentricity of an elliptical orbit that approaches 0 defines an orbit that is almost completely circular, such that the foci of the ellipse are very close together, while an eccentricity of an elliptical orbit that approaches 1 defines an orbit that has a more pronounced major axis, such that the foci of the ellipse are very far apart.

Inclination of a given satellite orbit is defined as an angle between an eccentricity vector of the orbit and the +Z-axis. An eccentricity vector of a given satellite orbit is a vector that connects the center of the celestial body with the perigee of the satellite orbit. In the example of FIG. 1, the orbit 14 of the satellite 12 has an eccentricity vector 24 that connects the Cartesian coordinate origin with the perigee 20. The orbit 14 of the satellite 12 thus has an inclination $\alpha$, as it is the angle between the +Z-axis and the eccentricity vector 24.

RAAN of a given satellite orbit is defined as an angle from a vernal equinox of a celestial body to an ascending node vector. A vernal equinox is a vector that connects the center of the celestial body with a fixed longitudinal point along an equatorial plane, thus creating a static vector. For example, Earth has a vernal equinox that is defined as an exact longitudinal measurement at the Equator at which the Sun crosses the Equator in the northbound direction. In the example of FIG. 1, for the sake of simplicity, the celestial body 16 has a vernal equinox that is collinear with the +X-axis. An ascending node vector of a given satellite orbit is defined as a vector that connects the center of the celestial body with the ascending node. An ascending node is a point at which the satellite crosses the equatorial plane in the northbound direction. In the example of FIG. 1, the orbit 14 of the satellite 12 has an ascending node vector 26. Accordingly, the orbit 14 of the satellite 12 has a RAAN $\omega$, as it is the angle between the vernal equinox at the +X-axis and the ascending node vector 26. It is to be understood that RAAN is measured as a right-handed rotation about the +Z-axis. It is also to be understood that a satellite orbit with an inclination of 90° is coplanar with the equatorial plane, and therefore has no ascending node and thus no RAAN.

Argument of perigee of a given satellite orbit is defined as an angle between an ascending node vector and an eccentricity vector, measured in the direction of the satellite's motion. In the example of FIG. 1, the orbit 14 of the satellite 12 has an argument of perigee $\theta$, as it is the angle between the ascending node vector 26 and the eccentricity vector 24.

True anomaly of a given satellite orbit is an angle between an eccentricity vector and a satellite position vector, measured in the direction of the satellite's motion. A satellite position vector is a vector that connects the center of a celestial body with the satellite's current position along the given orbit. Accordingly, the satellite position vector is always changing, and thus the true anomaly has a dynamic value. In the example of FIG. 1, the satellite 12 has an instantaneous satellite position vector 28 (only partially illustrated for clarity of the drawing). Accordingly, the orbit 14 of the satellite 12 has an instantaneous true anomaly $\phi$, as it is the angle between the eccentricity vector 24 and the satellite position vector 28.

Having established the six orbital parameters that define a given orbit for a given satellite, it is to be understood how to apply the six orbital parameters to two or more satellites to create motion relative to each other. This relative motion based on relative changes in the orbital parameters is demonstrated in FIGS. 2-4.

Figure 2:
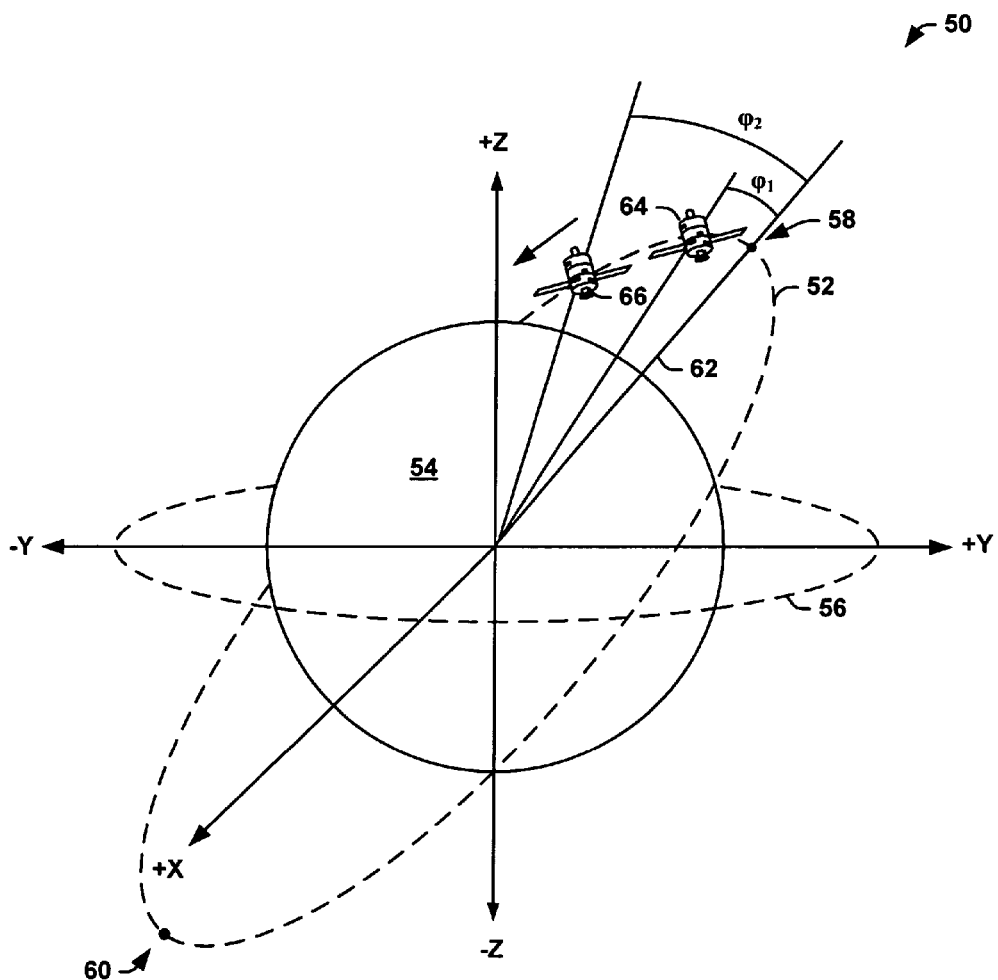
FIG. 2 illustrates a pair of satellites in an orbit around a celestial body in accordance with an aspect of the invention.

FIG. 2 illustrates a satellite system 50 that includes a satellite orbit 52 around a celestial body 54 in accordance with an aspect of the invention. The celestial body 54 could be, for example, Earth, and is centered at the origin of a three-dimensional Cartesian coordinate system with defined X, Y, and Z-axes. The celestial body 54 has an equatorial plane 56 that is coplanar with the X-Y plane. In the example of the celestial body 54 being Earth, the Z-axis could be collinear with the north and south poles, and the equatorial plane 56 could be coplanar with the Earth's Equator. The orbit 52 is illustrated as an inclined, elliptical orbit. The orbit 52 has a perigee 58 in the +Z direction above the X-Y plane and an apogee 60 in the −Z direction below the X-Y plane. It is to be understood that the orbit 52 is not limited to the inclined, elliptical orbit depicted in the example of FIG. 2, but could be any type of orbit, such as a circular orbit. In the example of FIG. 2, the orbit has an eccentricity vector 62 that connects the Cartesian coordinate origin with the perigee 58.

The satellite system 50 includes a satellite 64 and a satellite 66 that occupy the orbit 52. As illustrated in the example of FIG. 2, the satellite 64 has an instantaneous true anomaly $\phi_1$, and the satellite 66 has an instantaneous true anomaly $\phi_2$. As the remaining five orbital parameters are the same for the orbit 52 of the satellite 64 and the orbit 52 of the satellite 66, the satellites 64 and 66 occupy the same orbit 52 with a variation only in true anomaly $\phi$. The result is a leader-follower orbit, where each of the satellites 64 and 66 occupy the same orbital path and remain at a close proximity to each other. The satellite 64 therefore exhibits an along-track offset relative to the satellite 66 because it follows the same orbital path, but is staggered behind by an amount that is approximately equal to $\phi_2 - \phi_1$. It is to be understood that, for example, if the satellites 64 and 66 occupy a circular orbit, the satellites 64 and 66 would remain at a substantially constant distance from each other because the satellites 64 and 66 have a substantially constant velocity throughout the period of the orbit. However, if the satellites 64 and 66 occupy an elliptical orbit, such as demonstrated in the example of FIG. 2, the distance between the satellites 64 and 66 changes only slightly throughout the period of the orbit due to the changes in satellite orbital velocity dictated by Kepler's laws of orbital motion, but the average distance from one orbital period to the next remains constant. The significance of establishing variations of true anomaly $\phi$ between a group of satellites becomes more apparent with reference to FIG. 3 below.

Figure 3:
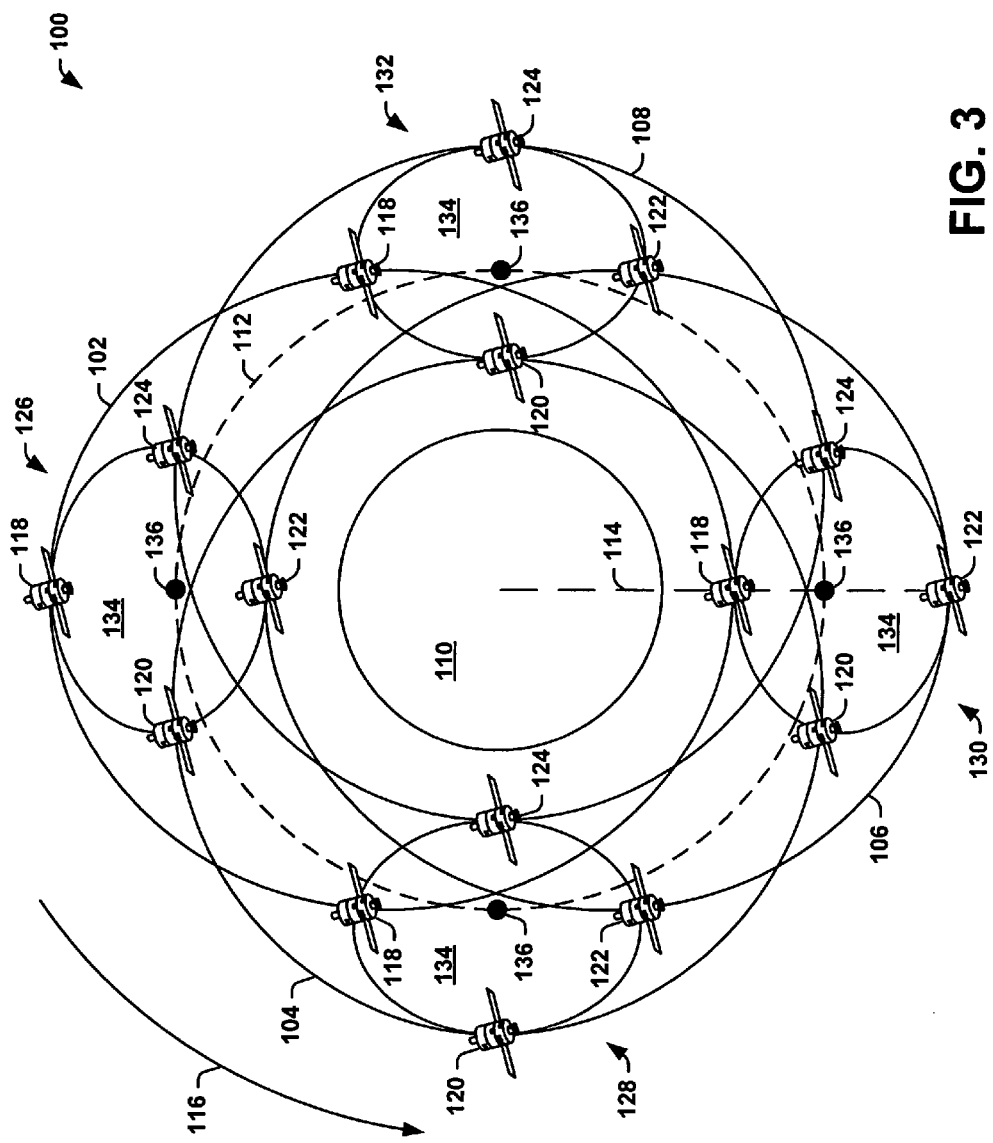
FIG. 3 illustrates a group of satellites in separate orbits around a celestial body in accordance with an aspect of the invention.

FIG. 3 illustrates a satellite system 100 of four satellite orbits 102, 104, 106, and 108 around a celestial body 110 in accordance with an aspect of the invention. The celestial body 110 could be, for example, Earth. Each of the orbits 102, 104, 106, and 108 are illustrated as elliptical orbits. The satellite system 100 also includes a circular reference orbit 112 that is centered on the celestial body 110. In the example of FIG. 3, each of the elliptical orbits 102, 104, 106, and 108, and the circular reference orbit 112 are all coplanar, such that they each have an equal value of inclination. Accordingly, each of the elliptical orbits 102, 104, 106, and 108 in the satellite system 100 has a common ascending node vector 114. However, each of the elliptical orbits 102, 104, 106, and 108 has a separate value of argument of perigee $\theta$, as measured from an orbital direction arrow 116. For example, orbit 102 has an argument of perigee $\theta_1=0°$, orbit 104 has an argument of perigee $\theta_2=90°$, orbit 106 has an argument of perigee $\theta_3=180°$, and orbit 108 has an argument of perigee $\theta_4=270°$.

In the example of FIG. 3, each of the satellite orbits 102, 104, 106, and 108 has a single satellite occupying the orbit. Orbit 102 contains a satellite 118, orbit 104 contains a satellite 120, orbit 106 contains a satellite 122, and orbit 108 contains a satellite 124. It is to be understood that each of the satellites 118, 120, 122, and 124 is depicted in four separate places to signify four separate phases 126, 128, 130, and 132 during the respective periods of each of the orbits 102, 104, 106, and 108. At each of the four separate phases 126, 128, 130, and 132, each of the satellites 118, 120, 122, and 124 has a separate value of true anomaly $\phi$ with respect to its orbit. For example, at the phase 126, the satellite 122 has a true anomaly $\phi_1=0°$, the satellite 120 has a true anomaly $\phi_2=90°$, the satellite 118 has a true anomaly $\phi_3=180°$, and the satellite 124 has a true anomaly $\phi_4=270°$. At the phase 128, the satellite 124 has a true anomaly $\phi_4=0°$, the satellite 122 has a true anomaly $\phi_1=90°$, the satellite 120 has a true anomaly $\phi_2=180°$, and the satellite 118 has a true anomaly $\phi_3=270°$. At the phase 130, the satellite 118 has a true anomaly $\phi_3=0°$, the satellite 124 has a true anomaly $\phi_4=90°$, the satellite 122 has a true anomaly $\phi_1=180°$, and the satellite 120 has a true anomaly $\phi_2=270°$. At the phase 132, the satellite 120 has a true anomaly $\phi_2=0°$, the satellite 118 has a true anomaly $\phi_3=90°$, the satellite 124 has a true anomaly $\phi_4=180°$, and the satellite 122 has a true anomaly $\phi_1=270°$. It is to be understood that, due to the change of velocity exhibited by a satellite in an elliptical orbit as dictated by the Keplerian laws of orbital motion, the values of true anomaly $\phi$ may not be perfectly 90° out of phase for a given set of four satellites to obtain an approximately uniformly spaced phase distribution, as depicted in the example of FIG. 3. It is also to be understood that, in order to achieve the uniformly spaced phase distribution of the four satellites 118, 120, 122, and 124 demonstrated in the four phases 126, 128, 130, and 132, the sum of the values of argument of perigee $\theta$ and true anomaly $\phi$ of each of the satellites 118, 120, 122, and 124, respectively, should approximately equal 360° at the ascending node vector 114.

The result of the phase distribution of each of the four satellites 118, 120, 122, and 124, such that the four satellites 118, 120, 122, and 124 are grouped together at a given instantaneous moment in time despite having values of argument of perigee $\theta$ that are 90° out-of-phase with respect to each other, is the creation of a Hill's orbit 134. In the example of FIG. 3, the Hill's orbit 134 is created as a substantially elliptical sub-orbit of the four satellites 118, 120, 122, and 124 around a reference point 136, where the reference point 136 is a point that orbits the celestial body in the circular reference orbit 112 in the same direction 116 as the satellites 118, 120, 122, and 124. Accordingly, the four satellites 118, 120, 122, and 124 each exhibit a periodic motion relative to the reference point 136. Specifically, in the example of FIG. 3, the periodic motion of the satellites 118, 120, 122, and 124 is such that the satellites 118, 120, 122, and 124 appear to orbit the reference point 136 in a clock-wise manner, while the entire Hill's orbit 134 appears to orbit the celestial body 110 in the counterclockwise direction 116. At any given instantaneous moment in time, the reference point 136 appears to be approximately at the center of the Hill's orbit 134 as the Hill's orbit 134 orbits the celestial body 110.

In the example of FIG. 3, it is to be understood that the reference point 136 could be another satellite that is orbiting the celestial body 110 in the circular reference orbit 112, such that the four satellites 118, 120, 122, and 124 in the Hill's orbit 134 orbit a satellite at the reference point 136. It is also to be understood that the size of the ellipse of the Hill's orbit 134 depends on the eccentricity values of each of the orbits 102, 104, 106, and 108. For example, larger values of eccentricity (e.g., approaching 1) for each of the orbits 102, 104, 106, and 108 create a very large Hill's orbit 134, such that, at their closest point, none of the satellites 118, 120, 122, and 124 come to within a thousand or more kilometers of the reference point 136. As another example, smaller values of eccentricity (e.g., approaching 0) for each of the orbits 102, 104, 106, and 108 create a very small Hill's orbit 134, such that, at their closest point, the satellites 118, 120, 122, and 124 could come to within fifteen meters of the reference point 136. It is to be further understood that, in order to achieve the phase distribution of the four satellites 118, 120, 122, and 124 in the Hill's orbit 134 demonstrated in the example of FIG. 3, the sum of the values of argument of perigee $\theta$ and true anomaly $\phi$ of each of the satellites 118, 120, 122, and 124, respectively, approximately equals 360° when the reference point 136 crosses the ascending node vector 114. It is even further to be understood that the Hill's orbit 134 need not be limited to four satellites, as depicted in the example of FIG. 3, but could contain as many satellites as desired by adding additional satellite orbits, each with additional out-of-phase combinations of argument of perigee $\theta$ and true anomaly $\phi$. Alternatively, the Hill's orbit 134 could contain as few as one satellite.

Figure 4:
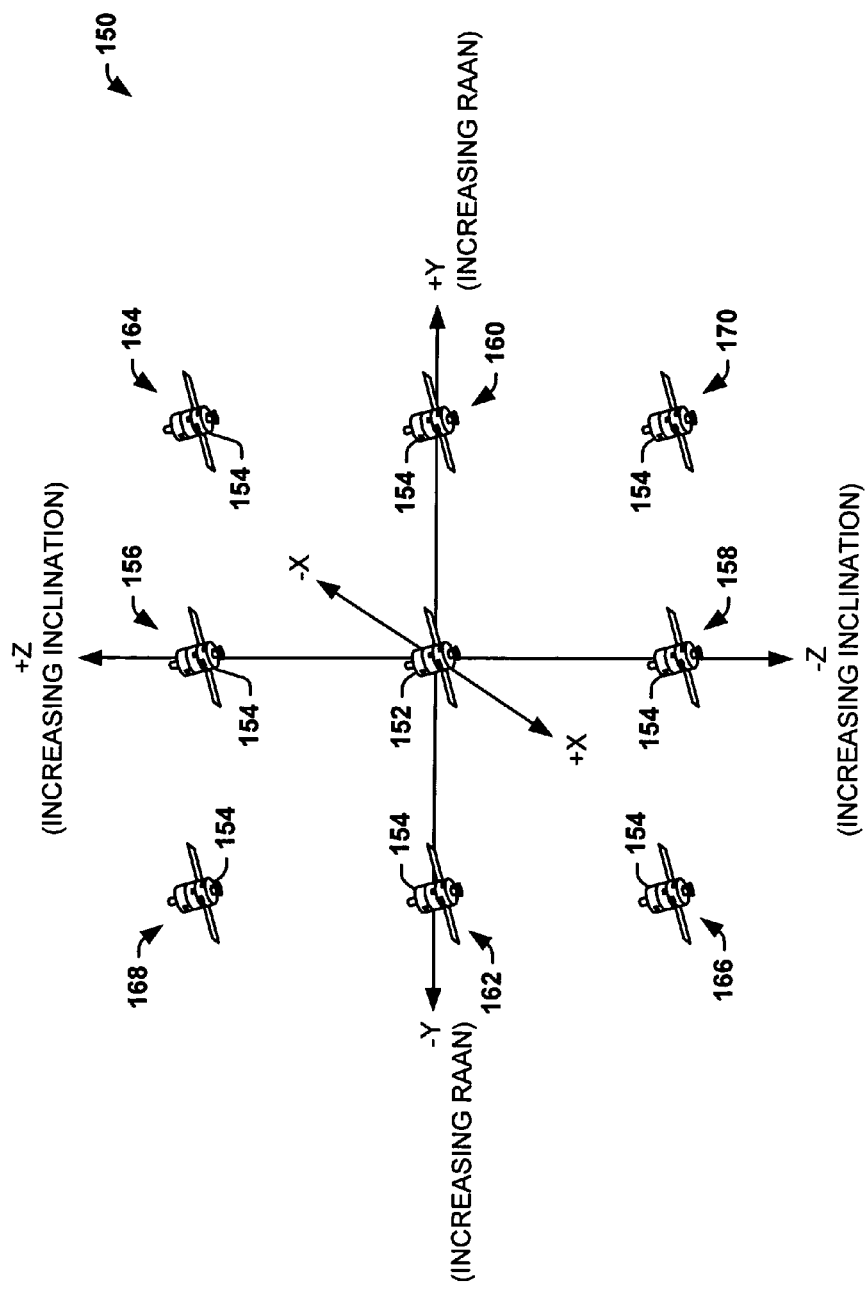
FIG. 4 illustrates relative cross-track motion of satellites in accordance with an aspect of the invention.

FIG. 4 illustrates a satellite system 150 demonstrating a relative motion of two satellites 152 and 154 using a three-dimensional Cartesian coordinate system with defined X, Y, and Z-axes. The satellites 152 and 154 are each in a separate orbit around a celestial body (not shown), such as Earth, with an approximately −X-axis orbital direction. The satellite 152 has a first value of RAAN $\omega_1$ and a first value of inclination $\alpha_1$, and the satellite 154 has a second value of RAAN $\omega_2$ and a second value of inclination $\alpha_2$, such that the satellite 154 has a different value for at least one of RAAN $\omega$ and inclination $\alpha$. For purposes of the discussion of the example of FIG. 4, the satellite 152 is stationary at the origin of the Cartesian coordinate system with respect to the motion of the satellite 154. Accordingly, FIG. 4 demonstrates a cross-track separation of the relative motion of the satellite 154 with respect to the satellite 152, with substantially no along-track offset between the satellite 152 and the satellite 154.

As demonstrated in FIG. 4, relative changes in values of inclination $\alpha$ and RAAN $\omega$ of a first satellite in a first orbit relative to a second satellite in a second orbit creates a periodic motion of one satellite relative to the other. Specifically, the periodic motion is an oscillatory motion normal to the orbital path of the first satellite relative to the second satellite. Accordingly, in the example of FIG. 4, the satellite 154 exhibits a periodic motion in the form of an oscillatory motion in the Y-Z Cartesian coordinate plane relative to the satellite 152 along their respective orbital paths as a result of the variation of RAAN $\omega$ and/or inclination $\alpha$ of the satellite 154 relative to the satellite 152. It is to be understood that, in the example of FIG. 4, the satellites 152 and 154 are each in orbits that substantially resemble the orbit 14 demonstrated in FIG. 1 for purposes of the determination of relative values of RAAN $\omega$ and/or inclination $\alpha$. It is to be further understood that, in the example of FIG. 4, both of the satellites 152 and 154 are phased together, such that they each have a true anomaly value $\phi$ that is approximately equal with respect to each other. However, for purposes of the discussion of FIG. 4, it is to be assumed that a collision of the two satellites at the origin of the Y-Z Cartesian coordinate plane is not a factor for consideration. It is also to be noted that the other orbital parameters (mean altitude, eccentricity, and argument of perigee) for each of the orbits for the satellites 152 and 154 are approximately equal.

As depicted in the example of FIG. 4, as the absolute value of the inclination $\alpha_2$ of the satellite 154 increases relative to the value of the inclination $\alpha_1$ by an amount $\Delta\alpha$, the satellite 154 exhibits a vertical oscillatory motion along the Z-axis. Depending on the magnitude of the $\Delta\alpha$, the separation of the satellite 154 relative to the satellite 152 along the Z-axis could vary by as little as a few meters to as many as several kilometers. As an example, if the inclination $\alpha_2$ of the satellite 154 is less than the inclination $\alpha_1$ of the satellite 152, the satellite 154 oscillates along the Z-axis, reaching a peak amplitude on the +Z-axis at a position 156, when each of the satellites 152 and 154 are at perigee, and reaching a peak amplitude on the −Z-axis at a position 158, when each of the satellites 152 and 154 are at apogee. Alternatively, if the inclination $\alpha_2$ of the satellite 154 is greater than the inclination $\alpha_1$ of the satellite 152, the satellite 154 reaches a peak amplitude on the +Z-axis at the position 156, when each of the satellites 152 and 154 are at apogee, and reaches a peak amplitude on the −Z-axis at the position 158, when each of the satellites 152 and 154 are at perigee.

As depicted in the example of FIG. 4, as the absolute value of the RAAN $\omega_2$ of the satellite 154 increases relative to the value of the RAAN $\omega_1$ by an amount $\Delta\omega$, the satellite 154 exhibits a horizontal oscillatory motion along the Y-axis. Depending on the magnitude of the $\Delta\omega$, the separation of the satellite 154 relative to the satellite 152 along the Y-axis could vary by as little as a few meters to as many as several kilometers. As an example, if the RAAN $\omega_2$ of the satellite 154 is less than the RAAN $\omega_1$ of the satellite 152, the satellite 154 oscillates along the Y-axis, reaching a peak amplitude on the +Y-axis at a position 160, when each of the satellites 152 and 154 are at perigee, and reaching a peak amplitude on the −Y-axis at a position 162, when each of the satellites 152 and 154 are at apogee. Alternatively, if the RAAN $\omega_2$ of the satellite 154 is greater than the RAAN $\omega_1$ of the satellite 152, the satellite 154 reaches a peak amplitude on the +Y-axis at the position 160, when each of the satellites 152 and 154 are at apogee, and reaches a peak amplitude on the −Y-axis at the position 162, when each of the satellites 152 and 154 are at perigee.

In the example of FIG. 4, the relative values of both the RAAN $\omega_2$ and the inclination $\alpha_2$ of the satellite 154 can be adjusted relative to the RAAN $\omega_1$ and the inclination $\alpha_1$ of the satellite 152 to produce a diagonal oscillatory motion of the satellite 154 relative to the satellite 152. As an example, the satellite 154 could oscillate from a position 164 (in the first Y-Z Cartesian coordinate plane quadrant) to a position 166 (in the third Y-Z Cartesian coordinate plane quadrant). Alternatively, the satellite 154 could oscillate from a position 168 (in the second Y-Z Cartesian coordinate plane quadrant) to a position 170 (in the fourth Y-Z Cartesian coordinate plane quadrant). The two position pairs between which the satellite 154 oscillates, as well as which of positions 164, 166, 168, and 170 the satellite 154 occupies at perigee, depends on the relative positive or negative difference of the RAAN $\Delta\omega$ and the relative positive or negative difference of the inclination $\Delta\alpha$, as described above. It is to be understood that the positions 164, 166, 168, and 170, as demonstrated in the example of FIG. 4, are arbitrary, and the slope between any two oscillatory position pairs depends on the relative differences in the RAAN $\omega$ relative to the inclination $\alpha$, such that the slope of the oscillatory motion need not equal 1.

It is to be understood that, in the examples of FIGS. 2-4, some of the satellite motions described are subject to inherent drift (e.g., typically along-track) relative to a reference orbit, such as the reference orbit 112 in the example of FIG. 3. Such drift can typically be compensated by a slight adjustment of the mean altitude of the affected elliptical orbit relative to the reference orbit. It is also to be understood that, in the examples of FIGS. 2-4, the relative satellite motions in the satellite orbits around a celestial body that have been described are all as a result of natural Keplerian orbital motion, such that none of the satellites require additional expenditure of fuel to maintain a formation-flight position in their respective orbits. Accordingly, these satellites maintain substantially natural orbits without the use of impulsive delta-V thrusts, and are thus substantially delta-V-free. Having described some of the ways in which orbital parameters of satellites can be adjusted relative to each other to achieve relative movement between them, combining the resultant relative satellite motions results in a satellite system that comprises a plurality of satellites in a three-dimensional atomic satellite cloud cluster that is substantially delta-V-free in accordance with an aspect of the invention. The substantially delta-V-free three-dimensional atomic satellite cloud cluster is described in more detail below with regard to FIGS. 5-7.

Figure 5:
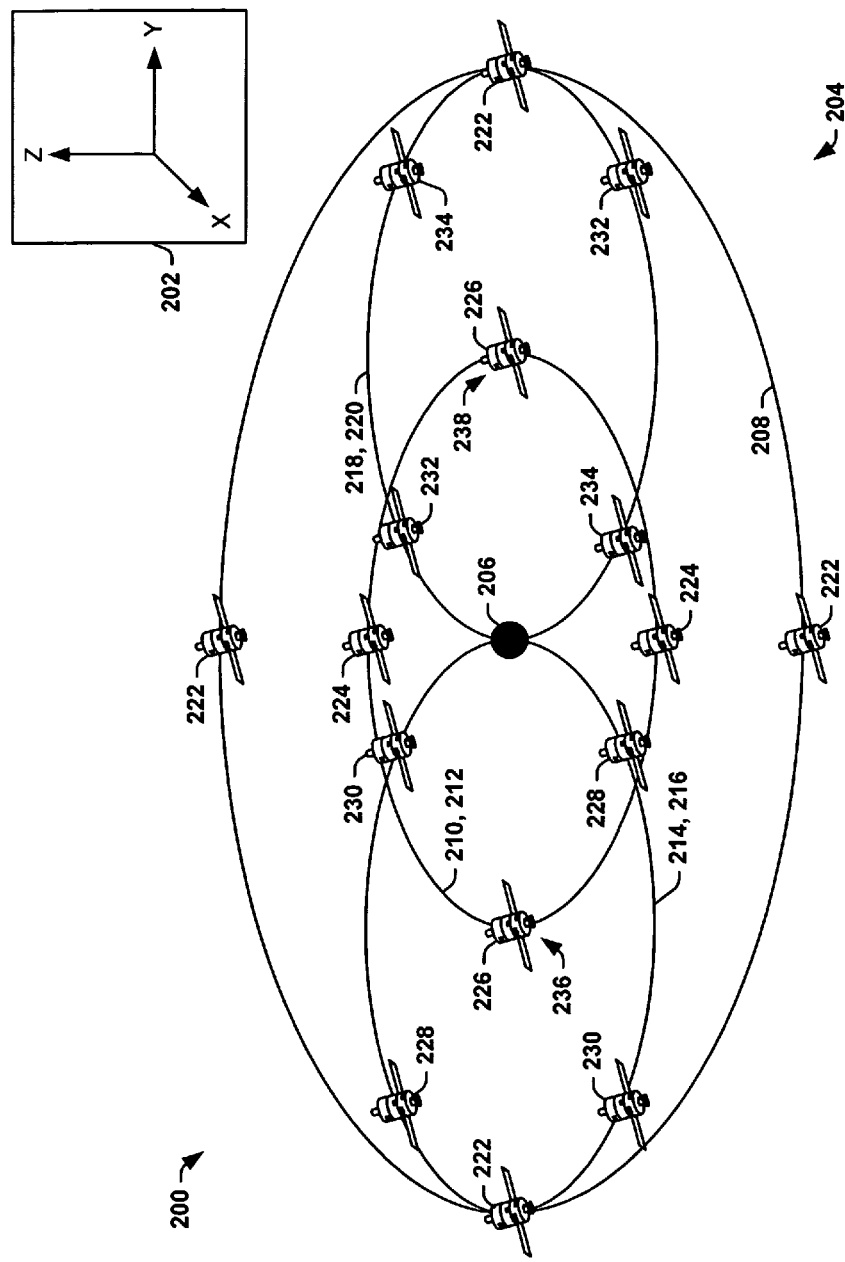
FIG. 5 illustrates a side-view of a substantially delta-V-free satellite cloud cluster in accordance with an aspect of the invention.
Figure 6:
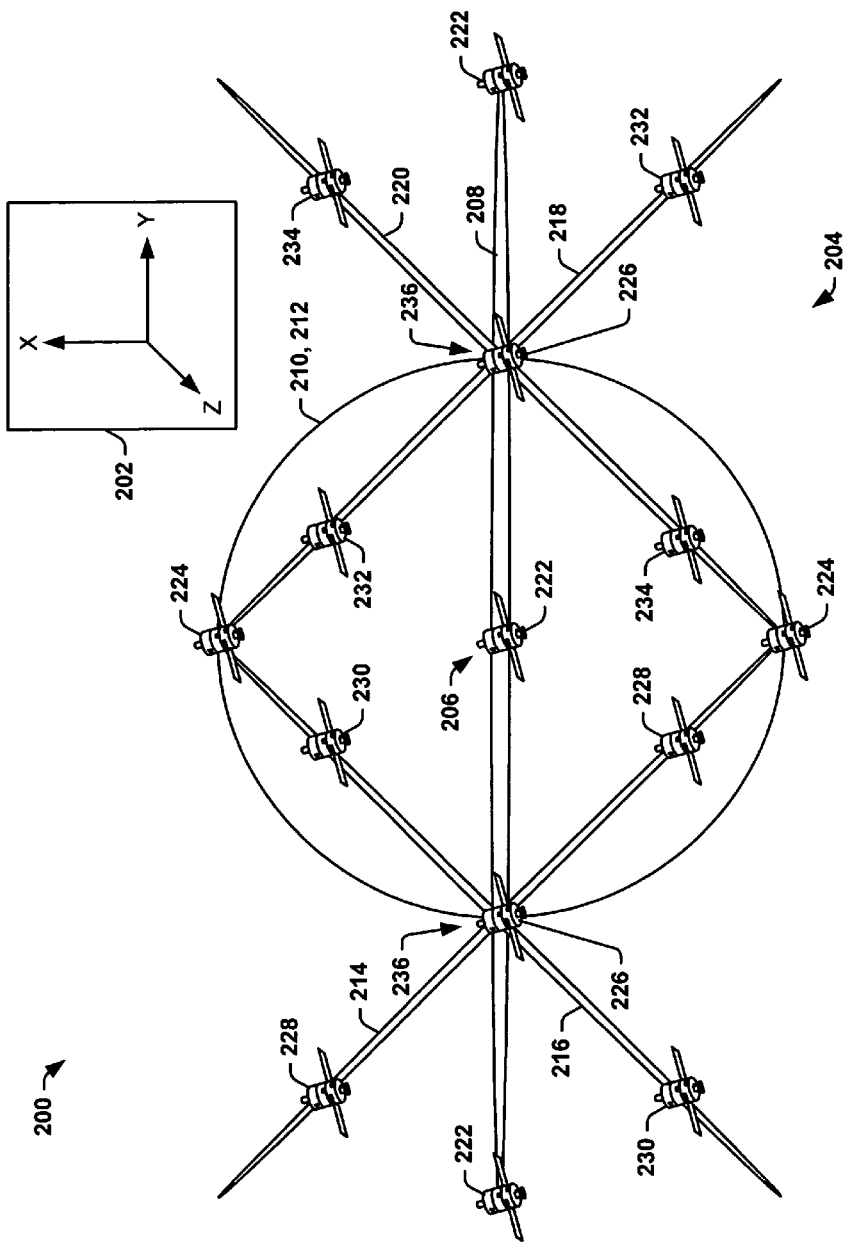
FIG. 6 illustrates a top-view of a substantially delta-V-free satellite cloud cluster in accordance with an aspect of the invention.
Figure 7:
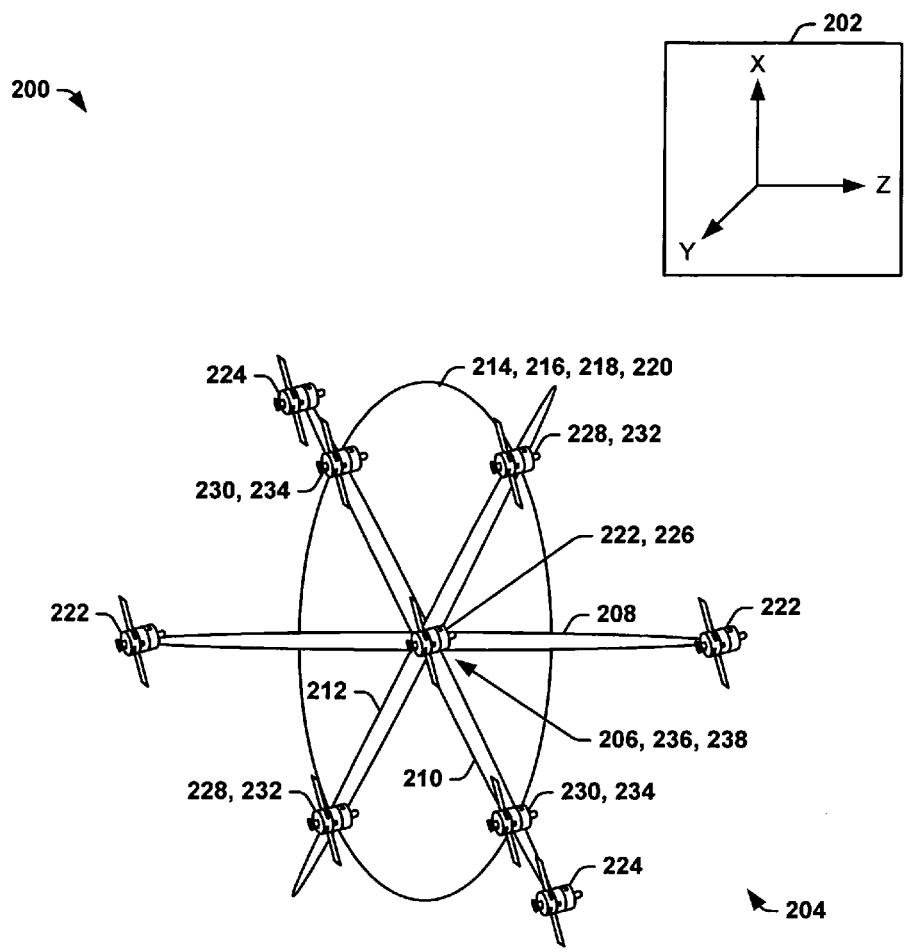
FIG. 7 illustrates a front-view of a substantially delta-V-free satellite cloud cluster in accordance with an aspect of the invention.

FIG. 5 illustrates a side-view of a substantially delta-V-free three-dimensional atomic satellite cloud cluster 200 (hereinafter described as "the satellite cloud cluster" for the sake of brevity) in accordance with an aspect of the invention. FIG. 6 illustrates a top-view of the satellite cloud cluster 200 in accordance with an aspect of the invention. FIG. 7 illustrates a front-view of the satellite cloud cluster 200 in accordance with an aspect of the invention. It is to be understood that the satellite cloud cluster 200 in the example of FIGS. 5-7 is one and the same depicted in different perspective views, as indicated by a Cartesian coordinate system 202 included in each of FIGS. 5-7. Accordingly, like reference numbers are used for the purpose of the discussion of FIGS. 5-7. Additionally, it is to be understood that, in the example of FIGS. 5-7, some objects have been given multiple reference numbers to represent multiple objects that are overlapped or otherwise obscured from view in the given perspective of the given one of FIGS. 5-7.

The satellite cloud cluster comprises a plurality of satellites 204, each in a separate and distinct orbit around a celestial body (not shown), such as Earth. Each of the orbits of each of the satellites 204 has a given set of orbital parameters that may differ slightly from each other, thus creating a periodic motion relative to a reference point 206. The reference point 206 could occupy a circular orbit around the celestial body, such that the reference point 206 and the satellite cloud cluster 200 both orbit the celestial body at approximately the same orbital velocity. The reference point is approximately centered within the satellite cloud cluster, and could be another satellite in the plurality of satellites 204. Each of the plurality of satellites 204 in the satellite cloud cluster 200 could be communicatively coupled to both the celestial body and to each other, such that they operate as one distributed satellite system. As such, the satellite cloud cluster 200 can operate as a single system that can receive uplink signals and transmit downlink signals more efficiently by employing the individual satellites 204 of the satellite cloud cluster 200 to communicate with each other and adjust communication parameters relative to each other.

The plurality of satellites 204 in the satellite cloud cluster 200 are arranged in a plurality of groups of satellites, each group of satellites exhibiting a set of similar orbital parameters to each other. In the example of FIGS. 5-7, the satellite cloud cluster includes a big Hill's group 208, a first atomic wing 210, a second atomic wing 212, a first atomic ring 214, a second atomic ring 216, a third atomic ring 218, and a fourth atomic ring 220. For the purposes of the description of FIGS. 5-7, it is to be assumed that the satellite cloud cluster has an orbital path in the +Y direction.

In the example of FIGS. 5-7, the big Hill's group 208 includes four satellites 222. The four satellites 222 each occupy orbits that have approximately the same value of mean altitude, inclination $\alpha$, RAAN $\omega$, and eccentricity, but have approximately 90° out-of-phase values with respect to each other for both argument of perigee $\theta$ and true anomaly $\phi$. Accordingly, the four satellites occupy a Hill's orbit, as described above regarding FIG. 3, and thus appear to orbit the reference point 206 in the Y-Z plane. As the individual orbits of each of the four satellites 222 all have approximately equal values of inclination $\alpha$, the center point of the celestial body of which the satellite cloud cluster orbits also occupies the Y-Z plane. While the satellites 222 of the big Hill's group 208 have individual orbits with the same value of eccentricity, the eccentricity of these orbits is greater than the orbits of the other satellites that are comprised within the satellite cloud cluster 200. The effect of this greater eccentricity is to create a larger Hill's orbit, as described above regarding FIG. 3.

In the example of FIGS. 5-7, the first atomic wing 210 includes two satellites 224 and the second atomic wing 212 includes two satellites 226. The two satellites 224 and the two satellites 226 each occupy orbits that have approximately the same value of mean altitude and eccentricity, but have approximately 180° out-of-phase values with respect to each other for both argument of perigee $\theta$ and true anomaly $\phi$. Accordingly, the two satellites in each of the first atomic wing 210 and the second atomic wing 212 occupy Hill's orbits, as described above regarding FIG. 3. However, as described above, the eccentricity value of the orbits of the satellites 224 and 226 is less than the orbits of the satellites 222 of the big Hill's group 208 to form smaller Hill's orbits. Additionally, the orbits of the satellites 224 in the first atomic wing 210 and the satellites 226 in the second atomic wing 212 have variations of inclination $\alpha$ and RAAN $\omega$ with respect to each other that result in cross-track periodic motions with respect to the center point 206. Accordingly, the satellites 224 in the first atomic wing 210 and the satellites 226 in the second atomic wing 212 thus appear to orbit the reference point 206 in planes that are approximately 60° of Y-Z plane (as depicted in FIG. 7). It is to be understood that the satellites 224 in the first atomic wing 210 are approximately 90° out-of-phase of the satellites 226 in the second atomic wing 212 relative to the reference point 206, such that the satellites 224 and 226 maintain spatial communicative coupling and to avoid collision.

In the example of FIGS. 5-7, the first atomic ring 214 includes two satellites 228, the second atomic ring 216 includes two satellites 230, the third atomic ring 218 includes two satellites 232, and the fourth atomic ring 220 includes two satellites 234. The satellites 228, 230, 232, and 234 in the respective atomic rings 214, 216, 218, and 220 all occupy orbits that have approximately the same value of mean altitude and eccentricity, but have approximately 180° out-of-phase values with respect to each other in a given atomic ring for both argument of perigee $\theta$ and true anomaly $\phi$. Accordingly, the two satellites in each of the atomic rings 214, 216, 218, and 220 occupy Hill's orbits, as described above regarding FIG. 3. However, as described above, the eccentricity value of the orbits of the satellites 228, 230, 232, and 234 is less than the orbits of the satellites 222 of the big Hill's group 208 to form smaller Hill's orbits. Additionally, the orbits of the satellites 228 in the first atomic ring 214 and the satellites 230 in the second atomic wing 216 have variations of inclination $\alpha$ and RAAN $\omega$ with respect to each other that result in cross-track periodic motions with respect to the center point 206. The same is true of the orbits of the satellites 232 in the third atomic ring 218 and the satellites 234 in the fourth atomic wing 220 with respect to each other. Additionally, the atomic rings 214, 216, 218, and 220 do not orbit the reference point 206. Instead, the atomic rings 214 and 216 are staggered ahead and the atomic rings 218 and 220 are staggered behind the reference point 206. The staggering ahead of the atomic rings 214 and 216 can be accomplished by decreasing the true anomaly $\phi$ of both of the satellites in each of the atomic rings 214 and 216 by an equal amount relative to the reference point 206. Likewise, the staggering behind of the atomic rings 218 and 220 can be accomplished by increasing the true anomaly $\phi$ of both of the satellites in each of the atomic rings 218 and 220 by an equal amount relative to the reference point 206. Accordingly, the atomic rings 214, 216, 218, and 220 incorporate the relative satellite motion of the leader-follower arrangement described above with regard to FIG. 2. The satellites 228 in the first atomic ring 214 and the satellites 230 in the second atomic ring 216 thus appear to orbit a reference point 236, and the satellites 232 in the third atomic ring 218 and the satellites 234 in the fourth atomic ring 220 thus appear to orbit a reference point 238. All four of the atomic rings 214, 216, 218, and 220 orbit their respective reference points in planes that are approximately 45° of Y-Z plane (as depicted in FIG. 6).

The satellites 228, 230, 232, and 234 in the atomic rings 214, 216, 218, and 220 are also organized in different phase arrangements within their respective Hill's orbits than the remaining other satellites 204 in the satellite cloud cluster 200. Specifically, the satellites 230 and 234 are arranged in 45° and 225° phases (as measured from the +Y orbital direction) and the satellites 228 and 232 are arranged in 135° and 315° phases. Such an arrangement can result from a 45° shift of both argument of perigee θ and true anomaly φ while still maintaining an approximate 360° sum of the two parameters at the ascending node vector (refer to FIG. 3 above). It is to be understood that the satellites 228 in the first atomic ring 214 are approximately 90° out-of-phase of the satellites 230 in the second atomic ring 216 relative to the reference point 236, such that the satellites 228 and 230 maintain spatial communicative coupling and to avoid collision. The same is true of the satellites 232 in the third atomic ring 218 and the satellites 234 in the fourth atomic wing 220 with respect to each other.

Figure 8:
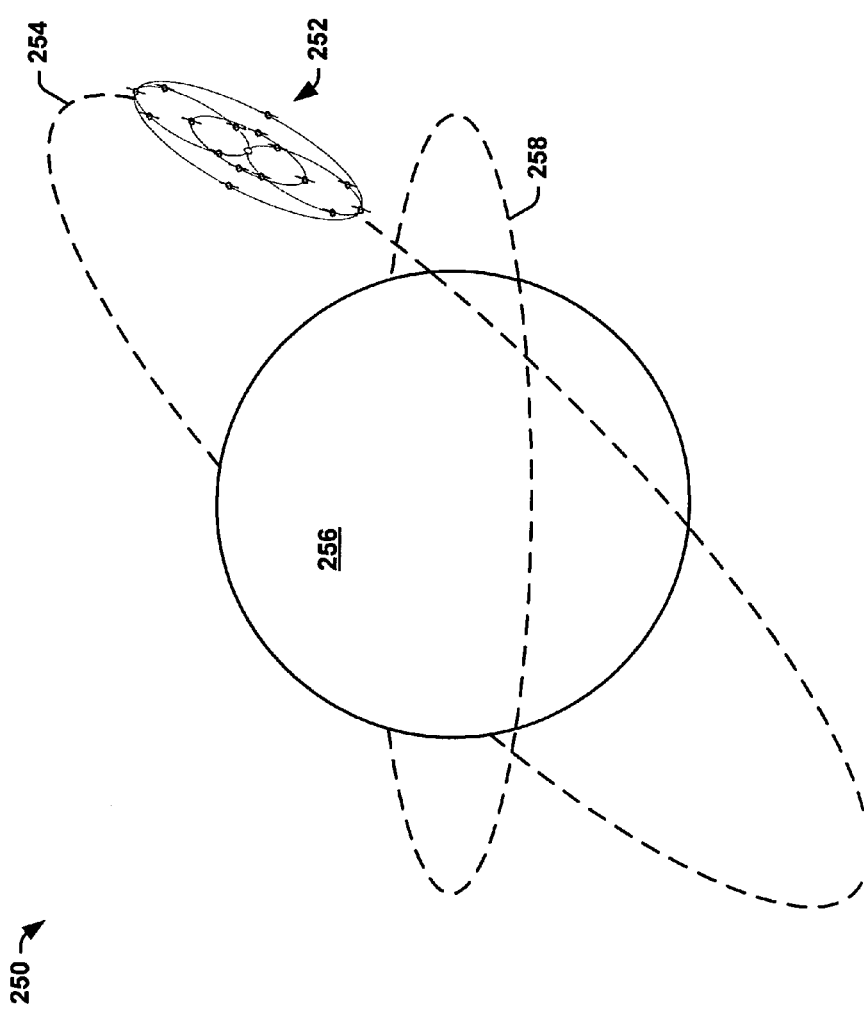
FIG. 8 illustrates a substantially delta-V-free satellite cloud cluster in orbit around a celestial body in accordance with an aspect of the invention.

FIG. 8 demonstrates a satellite system 250 that includes a satellite cloud cluster 252, such as the satellite cloud cluster 200 as described above regarding FIGS. 5-7, in an orbit 254 around a celestial body 256 in accordance with an aspect of the invention. The celestial body 256 could be, for example, Earth. The orbit 254 of the satellite cloud cluster 252 is illustrated as a circular orbit, inclined with respect to an equatorial plane 258. The orbit 254 is thus representative of the orbit of a reference point of the satellite cloud cluster 252, such as the reference point 206 in the satellite cloud cluster 200 in the example of FIGS. 5-7. The orbit 254 thus defines an orbit for the satellite cloud cluster 252 itself, and therefore may not actually define an orbit for any single satellite in the satellite cloud cluster 252. Instead, each of the satellites in the satellite cloud cluster 252 may have a separate, elliptical orbit, each with a separate set of orbital parameters. This allows the satellite cloud cluster 252 to remain in a tight formation without the expenditure of fuel, thus making the satellite cloud cluster 252 substantially delta-V-free. It is to be understood that, in the example of FIG. 8, despite the size of the satellite cloud cluster 252 being variable, the satellite cloud cluster 252 is depicted in an exaggerated size relative to the celestial body 256 for the purpose of illustrative clarity.

The satellite cloud cluster 252 orbits the celestial body with a given orbital period, and each of the satellites in the satellite cloud cluster 252 may exhibit a periodic motion relative to a reference point, with the reference point orbiting the celestial body in the orbit 254 at the same orbital period as the satellite cloud cluster 252. The periodic motions of the satellites in the satellite cloud cluster 252 relative to the reference point thus also have the same period as the orbital period of the satellite cloud cluster 252. The three-dimensional shape and close proximity of the satellites in the satellite cloud cluster 252 allows the entire satellite cloud cluster to behave as a single, distributed satellite system. The satellite cloud cluster 252 thus can allow communicative coupling between all of the satellites contained within, allowing the satellite cloud cluster to receive uplinks from the celestial body 256 and transmit downlinks to the celestial body 256 more effectively.

Referring back to FIGS. 5-7, TABLE 1 below illustrates an example of sample values of orbital parameters for each of the sixteen satellites 204 in the satellite cloud cluster 200 in the example of FIGS. 5-7.

TABLE 1

| Type | Along-Track Offset | Mean Altitude (km) | Eccentricity | Inclination α | RAAN ω | Argument of Perigee θ | True Anomaly φ |
|---|---|---|---|---|---|---|---|
| Big Hill's | Center | 7878.14 | 1.80E−06 | 62.5 | 0 | 0 | 0 |
| Big Hill's | Center | 7878.14 | 1.80E−06 | 62.5 | 0 | 180 | 180 |
| Big Hill's | Center | 7878.14 | 1.80E−06 | 62.5 | 0 | 90 | 269.999789 |
| Big Hill's | Center | 7878.14 | 1.80E−06 | 62.5 | 0 | 270 | 90.0002084 |
| Atomic Wing | Center | 7878.14 | 8.75E−07 | 62.5001 | 0 | 270 | 90.0001 |
| Atomic Wing | Center | 7878.14 | 8.75E−07 | 62.4999 | 0 | 90 | 269.9999 |
| Atomic Wing | Center | 7878.14 | 8.75E−07 | 62.5 | 359.9999 | 0 | 0.0000522 |
| Atomic Wing | Center | 7878.14 | 8.75E−07 | 62.5 | 0.000113 | 180 | 179.9999478 |
| Atomic Ring | Lead | 7878.14 | 8.75E−07 | 62.49993 | 359.9999 | 225 | 135.0002046 |
| Atomic Ring | Lead | 7878.14 | 8.75E−07 | 62.50007 | 0.000075 | 45 | 314.9999955 |
| Atomic Ring | Lead | 7878.14 | 8.75E−07 | 62.50007 | 359.9999 | 135 | 225.0000646 |
| Atomic Ring | Lead | 7878.14 | 8.75E−07 | 62.49993 | 0.000075 | 315 | 45.00013545 |
| Atomic Ring | Follow | 7878.14 | 8.75E−07 | 62.49993 | 359.9999 | 225 | 135.0000046 |
| Atomic Ring | Follow | 7878.14 | 8.75E−07 | 62.50007 | 0.000075 | 45 | 314.9997955 |
| Atomic Ring | Follow | 7878.14 | 8.75E−07 | 62.50007 | 359.9999 | 135 | 224.9998646 |
| Atomic Ring | Follow | 7878.14 | 8.75E−07 | 62.49993 | 0.000075 | 315 | 44.99993545 |

By setting orbital parameters of the sixteen orbits of the satellites 204 as detailed in TABLE 1, the satellite cloud cluster 200 becomes a distributed satellite system. Each of the satellites 204 exhibits a periodic motion relative to the reference point 206, such that the periodic motion has a period equal to the orbital period of the entire satellite cloud cluster 200. As described above, the periodic motions of the satellites 204 of the satellite cloud cluster 200 in the example of FIGS. 5-7 are arranged in elliptical sub-orbits, each a Hill's orbit or a variation of a Hill's orbit. The elliptical sub-orbits define seven distinct planes, with the reference point 206 being included in three of the planes (e.g., the big Hill's group 208 and the atomic wings 210 and 212) and being equidistant from the other four planes (the atomic rings 214, 216, 218, and 220). As described above, the reference point 206 of the satellite cloud cluster 200 could be another satellite, for a total of seventeen satellites 204 in the satellite cloud cluster 200. The parameters outlined in TABLE 1 ensure that the satellite cloud cluster maintains a tight grouping of the satellites without the expenditure of delta-V to maintain formation. None of the satellites move to within approximately 13.76 meters of the reference point 206, and none of the satellites ever collide with each other. The entire satellite cloud cluster 200 has a length of approximately 60 m, a width of approximately 30 m, and a height of approximately 30 m at its greatest extremes in X-Y-Z space. Upon centering the reference point 206 at the origin of the Cartesian coordinate system 202, the periodic motions of the satellite cloud cluster 200 each exhibit symmetry about the reference point 206 in each of the X-Y, X-Z, and Y-Z planes.

With the arrangement of orbital parameters as dictated by TABLE 1, the satellite cloud cluster 200 in the example of FIGS. 5-7 is capable of maintaining an orbital period around the celestial body without the expenditure of fuel to maintain formation, and is therefore substantially delta-V-free in accordance with an aspect of the invention. Additionally, the periodic motions of the satellites in the big Hill's group 208, the atomic wings 210 and 212, and the atomic rings 214, 216, 218, and 220 give the satellite cloud cluster 200 three-dimensionality. The three-dimensional nature of the satellite cloud cluster 200 allows the satellite cloud cluster 200 to act as a single distributed satellite system that maintains communicative coupling between all of the satellites 204 in the satellite cloud cluster 200, and that receives and processes uplinks from the celestial body and transmits downlinks to the celestial body, in accordance with an aspect of the invention.

One implementation of the three-dimensionality of the satellite cloud cluster 200 is that the satellite cloud cluster can be used for inspection of a payload at the reference point 206. For example, if the reference point 206 is occupied by a reference satellite, the three-dimensional periodic motions of the remaining satellites 204 allow a number of views of the reference satellite at the reference point 206 over the course of a single orbital period. The satellites 222 in the big Hill's group 208 can provide four separate top and bottom views over the course of a single orbital period because there are four satellites 222 in the big Hill's group 208. The satellites 222 in the big Hill's group 208 could also provide four separate far-front and far-rear views, as well, if the satellites 224 and 226 in the atomic wings 210 and 212, respectively, did not obstruct the view of the satellites 222 due to the relative phasing. The satellites 224 and 226 in the atomic wings 210 and 212 could provide four separate front and rear views over the course of a single orbital period because there are a total of four satellites, satellites 224 and 226, in the atomic wings 210 and 212, respectively. The satellites 228, 230, 232, and 234 in the atomic rings 214, 216, 218, and 220 could provide four separate left and right side-views over the course of a single orbital period because there are a total of four satellites, satellites 230 and 232 in the atomic rings 216 and 218, respectively, for the left side, and a total of four satellites, satellites 228 and 234 in the atomic rings 214 and 220, respectively, for the right side.

It is to be understood that the orbital parameters of the satellites 204 in the satellite cloud cluster 200, as dictated by TABLE 1 and FIGS. 5-7 is but one example of a substantially delta-V-free three-dimensional atomic satellite cloud cluster in accordance with an aspect of the invention. TABLE 1 and FIGS. 5-7 merely establish an example of one such implementation, but any number of other satellite cloud clusters could be created in accordance with an aspect of the invention. For example, a given satellite cloud cluster in accordance with an aspect of the invention could have a different set of orbital parameters, more or less satellites in each satellite grouping, more or less satellite groupings, or any combination of these three variations. As another example, a satellite cloud cluster could also have more or less reference points, such that each such reference point still has satellites of that given satellite cloud cluster moving in a periodic motion relative to the give reference point.

Figure 9:
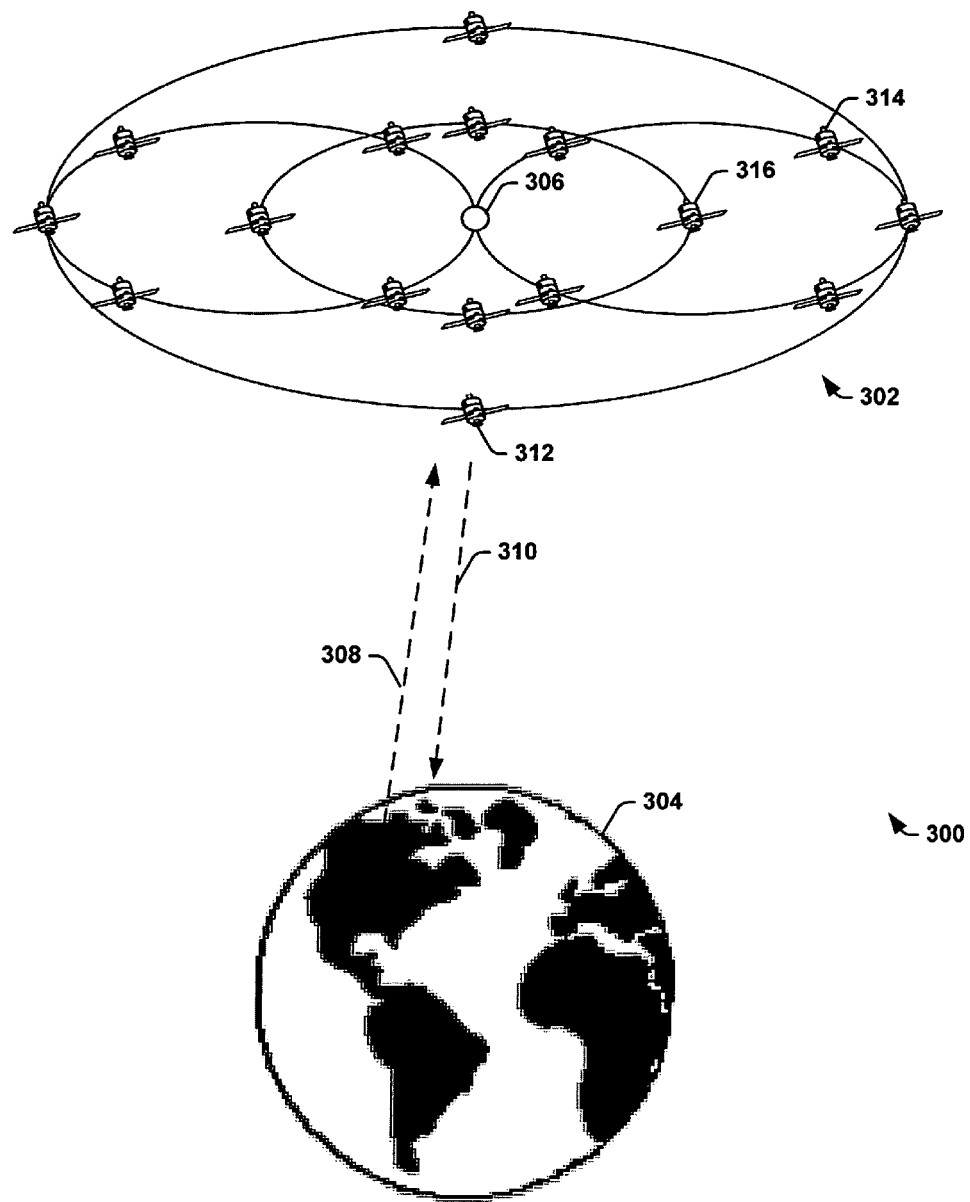
FIG. 9 illustrates a satellite communication system in accordance with an aspect of the invention.

FIG. 9 illustrates a satellite communication system 300 in accordance with an aspect of the invention. The satellite communication system 300 includes a satellite cloud cluster 302 in orbit around a celestial body 304, illustrated as Earth in the example of FIG. 9. The satellite cloud cluster 302 comprises a group of satellites that exhibit a periodic motion relative to a reference point 306, the reference point 306 also orbiting the celestial body 304 with the satellite cloud cluster 302. The satellite cloud cluster 302 communicates to at least one ground station (not shown) on the celestial body 304 via an uplink 308 and a downlink 310. It is to be understood that, in the example of FIG. 9, despite the size of the satellite cloud cluster 302 being variable, as described above in the examples of FIGS. 5-7, the satellite cloud cluster 302 is depicted in an exaggerated size relative to the celestial body 304 for the purpose of illustrative clarity.

In accordance with an aspect of the invention, the satellites of the satellite cloud cluster 302 maintain communicative contact with each other. Accordingly, the satellite cloud cluster 302 is capable of improved processing of uplink signals from the celestial body 304. For example, the satellite cloud cluster 302, by behaving as a single distributed satellite system, receives the uplink signal 308 from the celestial body 304. The connectivity of the uplink signal 308 may change rapidly, depending on such factors as the amount of information being conveyed, the motion of the satellite cloud cluster 302, proximity to the celestial body 304, etc. Accordingly, because the satellites of the satellite cloud cluster 302 maintain communicative contact with each other, the individual satellites of the satellite cloud cluster 302 can modify their individual signal processing capability and receiving parameters to compensate for the dynamic connectivity based on their relative positions within the satellite cloud cluster 302. For example, a satellite 312 in the satellite cloud cluster 302 may receive the uplink signal 308 one symbol before a satellite 314 in the satellite cloud cluster 302. A satellite 316 could synchronize the receipt of the uplink signal 308, such that the satellite 316 instructs the satellite 314 to delay processing by one symbol such that its receipt of the uplink signal 308 is synchronized with the satellite 312. Because the satellites in the satellite cloud cluster 302 are in a constant periodic motion around the reference point 306, different satellites in the satellite cloud cluster 302 could hand-off synchronization information as the satellite cloud cluster 302 orbits the celestial body 304. Additionally, the satellites in the satellite cloud cluster 302 could also adjust processing based on the knowledge of their relative positions at a given point in the orbit around the celestial body 304.

Also in accordance with an aspect of the invention, the satellite cloud cluster 302 is further capable of improved transmission of downlink signals to the celestial body 304 by each of the satellites in the satellite cloud cluster 302 modifying individual or collective transmission parameters. For example, the satellite cloud cluster 302, by behaving as a single distributed satellite system, wishes to transmit a downlink signal 310 to the celestial body 304. Connectivity information may have been interpreted for an uplink signal previously received by the satellite cloud cluster 302, such as the uplink signal 308 as described above. The connectivity information may be used by the satellite cloud cluster 302 to determine a direction from which the uplink signal 308 was transmitted by the one or more ground stations. Accordingly, the satellite cloud cluster 302 could then transmit the downlink signal 310 in the appropriately determined direction, based on the determined direction as communicated between the satellites of the satellite cloud cluster 302. Additionally, the additive effect of several of the satellites of the satellite cloud cluster 302 transmitting the downlink signal 310 could boost signal strength of the downlink signal 310 to overcome atmospheric or other sources of signal attenuation.

As another example of the functional three-dimensionality of the satellite cloud cluster 302, the satellites in the satellite cloud cluster 302 could each be given dedicated functionality or task-orientation that is specific to the satellites' positions relative to the reference point 306. Because the satellites in the satellite cloud cluster 302 are in a constant periodic motion around the reference point 306, different satellites in the satellite cloud cluster 302 could hand-off their dedicated functions to other satellites in the satellite cloud cluster 302 to at least one fixed point on the satellite cloud cluster's orbital path. The dedicated function hand-off allows functionality to remain specific to a position of the satellites relative to the reference point 306 or relative to the position of the satellite cloud cluster 302 relative to the celestial body 304. In addition, the periodic motion of the satellites in the satellite cloud cluster 302 allows the satellites in the satellite cloud cluster 302 to have a relatively unobstructed view of both the celestial body 304 or space beyond at any given time.

Figure 10:
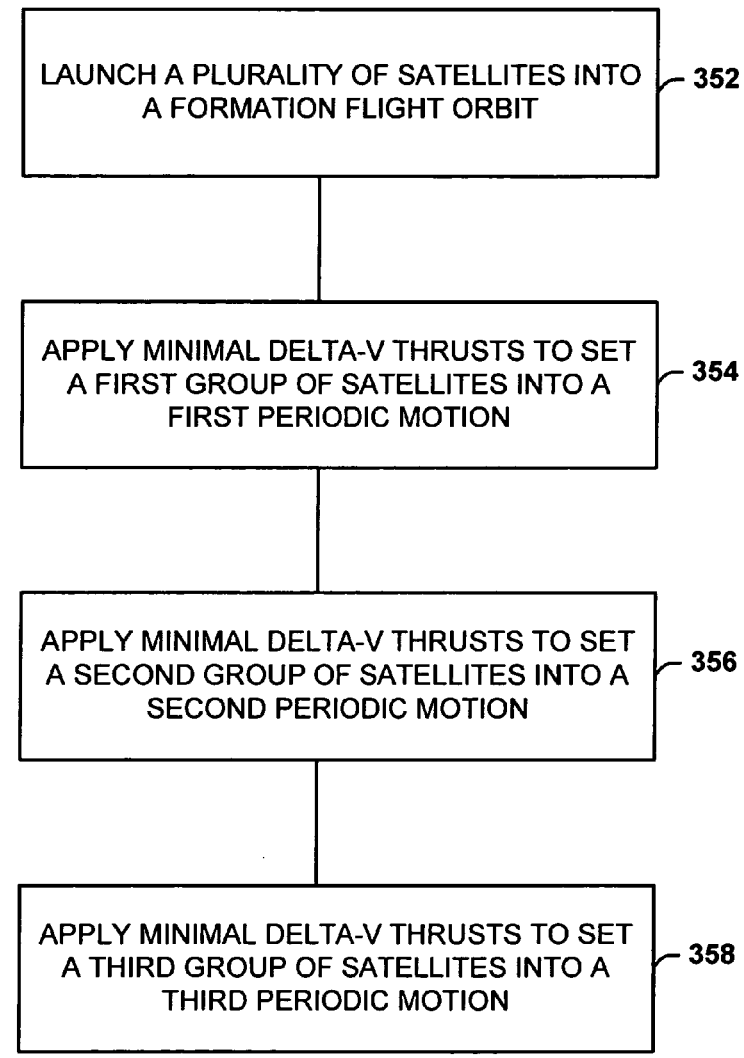
FIG. 10 illustrates a methodology for forming a substantially delta-V-free satellite cloud cluster in accordance with an aspect of the invention.

In view of the foregoing structural and functional features described above, a methodology in accordance with various aspects of the present invention will be better appreciated with reference to FIG. 10. While, for purposes of simplicity of explanation, the methodologies of FIG. 10 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 10 illustrates a method 350 for forming a substantially delta-V-free three-dimensional atomic satellite cloud cluster in accordance with an aspect of the invention. At 352, a plurality of satellites are launched into a formation-flight orbit around a celestial body. The formation-flight orbit could be a circular leader-follower orbit, such as described above regarding FIG. 2, and the celestial body could be Earth. At 354, a first group of satellites applies minimal delta-V impulsive thrusts to set the first group of satellites in a first periodic motion relative to a reference point. The reference point could orbit the celestial body along the same orbital path as the formation-flight at an approximately equal velocity. The first periodic motion could be a Hill's orbit. At 356, a second group of satellites applies minimal delta-V impulsive thrusts to set the second group of satellites in a second periodic motion relative to the reference point. The second periodic motion could be a combination of a Hill's orbit and a cross-track oscillation. At 358, a third group of satellites applies minimal delta-V impulsive thrusts to set the third group of satellites in a third periodic motion relative to the reference point. The third periodic motion could be a combination of a Hill's orbit and a cross-track oscillation. The third periodic motion could define a plane that does not include the reference point. The first, second, and third periodic motions could, in the aggregate, define a three-dimensional satellite cloud cluster that is substantially delta-V-free.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A satellite cluster system comprising:
 a plurality of satellites maintaining a three-dimensional periodic motion relative to a reference point, the plurality of satellites and the reference point maintaining an orbital pattern around a celestial body, the three-dimensional periodic motion being symmetrical about at least two planes that intersect at the reference point.

2. The satellite cluster system of claim 1, wherein at least a first portion of the plurality of satellites rotates around the reference point in an elliptical sub-orbit.

3. The satellite cluster system of claim 2, wherein the reference point is a first reference point and wherein at least a second portion of the plurality of satellites rotates around a second reference point in a second elliptical sub-orbit, the second reference point maintaining the orbital pattern around the celestial body and maintaining a substantially constant distance from the first reference point.

4. The satellite cluster system of claim 1, wherein the plurality of satellites are communicatively coupled, such that each satellite of the plurality of satellites adjusts transmission and receiving parameters to account for variations in phase, signal strength, and direction in a respective uplink or downlink signal relative to other satellites in the plurality of satellites.

5. The satellite cluster system of claim 1, wherein first defined orbits of a first portion of the plurality of satellites have values of an inclination and a right ascension of an ascending node (RAAN) that differ from second defined orbits of a second portion of the plurality of satellites.

6. The satellite cluster system of claim 5, wherein each satellite of the first portion of the plurality of satellites has an orbit with a value of argument of perigee and true anomaly that differs from other satellites in the first portion of the plurality of satellites, and each satellite of the second portion of the plurality of satellites has an orbit with a value of argument of perigee and true anomaly that differs from other satellites in the second portion of the plurality of satellites.

7. The satellite cluster system of claim 1, wherein an orbital path of the reference point is a circular orbit.

8. The satellite cluster system of claim 1, further comprising a satellite located at the reference point.

9. The satellite cluster system of claim 1, wherein the three-dimensional periodic motion is formed by minimal impulsive delta-V thrusts by the plurality of satellites from a formation flight orbit.

10. The satellite cluster system of claim 1, wherein at least one satellite in the plurality of satellites has a dedicated function relative to other satellites in the plurality of satellites, and the at least one satellite hands-off the dedicated function to at least one other satellite in the plurality of satellites at least one fixed point on the orbital path.

11. A satellite cluster system comprising:
 a first plurality of satellites maintaining a first periodic motion relative to a reference point, the reference point maintaining an orbital pattern around a celestial body;
 a second plurality of satellites maintaining a second periodic motion relative to the reference point; and
 a third plurality of satellites maintaining a third periodic motion relative to the reference point, the combination of the first, second, and third periodic motions forming a three-dimensional atomic satellite cluster relative to the reference point, and each of the first, second, and third pluralities of satellites being communicatively coupled to each other.

12. The satellite cluster system of claim 11, wherein the first periodic motion defines a first plane, the second periodic motion defines a second plane, and the third periodic motion defines a third plane.

13. The satellite cluster system of claim 12, wherein the reference point is located in the first plane, and wherein the second plane and the third plane are each equidistant from the reference point.

14. The satellite cluster system of claim 11, wherein the orbital pattern is a circular orbit.

15. The satellite cluster system of claim 11, wherein the first plurality of satellites occupy first defined orbits, the second plurality of satellites occupy second defined orbits, the third plurality of satellites occupy third defined orbits, and wherein each of the first defined orbits, the second defined orbits, and the third defined orbits have distinct values of inclination and right ascension of an ascending node (RAAN).

16. The satellite cluster system of claim 11, wherein each one of the satellites in each of the first plurality of satellites, the second plurality of satellites, and the third plurality of satellites occupies a separate orbit with a distinct argument of perigee and a distinct true anomaly, such that each one of the satellites in each of the first plurality of satellites, the second plurality of satellites, and the third plurality of satellites has a uniformly spaced phase-distribution in each of the first periodic motion, the second periodic motion, and the third periodic motion, respectively.

17. The satellite cluster system of claim 16, wherein the sum of the argument of perigee and the true anomaly for each orbit for each one of the plurality of satellites in each of the first plurality of satellites, the second plurality of satellites, and the third plurality of satellites is approximately equal to 360° at an ascending node vector.

18. The satellite cluster system of claim 11, further comprising a satellite located at the reference point.

19. The satellite cluster system of claim 11, wherein the each of the first periodic motion, the second periodic motion, and the third periodic motion are formed by minimal impulsive delta-V thrusts by each of the first plurality of satellites, the second plurality of satellites, and the third plurality of satellites, respectively, from a formation flight orbit.

20. The satellite cluster system of claim 11, wherein each satellite of the first plurality of satellites, the second plurality of satellites, and the third plurality of satellites adjusts transmission and receiving parameters to account for variations in phase, signal strength, and direction in a respective uplink or downlink signal relative to other satellites in each of the first plurality of satellites, the second plurality of satellites, and the third plurality of satellites.

21. The satellite cluster system of claim 11, wherein at least one satellite in each of the first plurality of satellites, the second plurality of satellites, and the third plurality of satellites has at least one dedicated function relative to other satellites in each of the first plurality of satellites, the second plurality of satellites, and the third plurality of satellites, and wherein the dedicated function is handed-off to at least one other satellite in the respective first plurality of satellites, second plurality of satellites, and third plurality of satellites at least one fixed point in the orbital path.

22. A method for establishing a satellite cluster orbit, the method comprising:
launching the satellite cluster into a formation-flight to maintain an orbital path about a celestial body;
applying minimal delta-V impulse thrusts to a first plurality of satellites of the satellite cluster to set the first plurality of satellites in a first periodic motion relative to a reference point, the reference point orbiting the celestial body at an equal velocity along the same orbital path as the formation flight;
applying minimal delta-V impulse thrusts to a second plurality of satellites of the satellite cluster to set the second plurality of satellites in a second periodic motion relative to the reference point; and
applying minimal delta-V impulse thrusts to a third plurality of satellites of the satellite cluster to set the third plurality of satellites in a third periodic motion relative to the reference point, the combination of the first, second, and third periodic motions forming a three-dimensional atomic satellite cluster relative to the reference point.

23. The method of claim 22, further comprising forming the first periodic motion into a first elliptical rotation defining a first plane, the reference point occupying the first plane, forming the second periodic motion into a second elliptical rotation defining a second plane, and forming the third periodic motion into a third elliptical rotation defining a third plane, the distance from the reference point to the second plane and from the reference point to the third plane being approximately equal and substantially constant.

24. The method of claim 22, further comprising modifying an inclination and a right ascension of an ascending node (RAAN) of each orbit of the satellites of each of the first plurality of satellites, the second plurality of satellites, and the third plurality of satellites relative to each other.

25. The method of claim 22, further comprising setting the orbital path about the celestial body as a circular orbit.

26. The method of claim 22, further comprising setting a distinct value for argument of perigee and a distinct value for true anomaly for each one of the satellites in each of the first plurality of satellites, the second plurality of satellites, and the third plurality of satellites, such that each one of the satellites in each of the first plurality of satellites, the second plurality of satellites, and the third plurality of satellites has a uniformly spaced phase-distribution in each of the first periodic motion, the second periodic motion, and the third periodic motion, respectively.

27. The method of claim 26, further comprising setting the sum of the argument of perigee and the true anomaly for each orbit of each one of the satellites in each of the first plurality of satellites, second plurality of satellites, and third plurality of satellites approximately equal to 360° at an ascending node vector.

28. The method of claim 22, further comprising establishing one satellite of the satellite cluster as the reference point.

29. The method of claim 22, further comprising handing-off a dedicated functionality of at least one satellite of each of the first plurality of satellites, the second plurality of satellites, and the third plurality of satellites to at least one other satellite of each of the first plurality of satellites, the second plurality of satellites, and the third plurality of satellites at least one fixed point on the orbital path.

30. The method of claim 22, further comprising modifying transmission and receiving parameters for a respective uplink or downlink of each satellite in each of the first plurality of satellites, the second plurality of satellites, and the third plurality of satellites relative to a position of the satellite in the respective first periodic motion, second periodic motion, and third periodic motion.

* * * * *